US012798370B2

(12) United States Patent
Maier et al.

(10) Patent No.: US 12,798,370 B2
(45) Date of Patent: Nov. 17, 2026

(54) METHOD FOR OPERATING A DIGITAL ASSISTANT OF A VEHICLE, COMPUTER-READABLE MEDIUM, SYSTEM, AND VEHICLE

(71) Applicant: Bayerische Motoren Werke Aktiengesellschaft, Munich (DE)

(72) Inventors: Claudia Maier, Holzkirchen (DE); Franziska Hertlein, Munich (DE); Michael Stecher, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 420 days.

(21) Appl. No.: 18/264,537

(22) PCT Filed: Feb. 10, 2022

(86) PCT No.: PCT/EP2022/053269
§ 371 (c)(1),
(2) Date: Aug. 7, 2023

(87) PCT Pub. No.: WO2022/194458
PCT Pub. Date: Sep. 22, 2022

(65) Prior Publication Data

US 2024/0042856 A1 Feb. 8, 2024

(30) Foreign Application Priority Data

Mar. 17, 2021 (DE) ..................... 10 2021 106 520.8

(51) Int. Cl.
*B60K 35/00* (2024.01)
*G06F 3/01* (2006.01)
(Continued)

(52) U.S. Cl.
CPC .............. *B60K 35/00* (2013.01); *G06F 3/017* (2013.01); *G10L 15/22* (2013.01); *B60K 35/10* (2024.01);
(Continued)

(58) Field of Classification Search
CPC .. B60K 35/00; B60K 2360/148; B60K 35/10; G06F 3/017; G10L 15/22; G10L 2015/223
See application file for complete search history.

(56) References Cited

U.S. PATENT DOCUMENTS

2014/0136013 A1* 5/2014 Wolverton ............. B60K 35/10 701/1
2014/0136187 A1* 5/2014 Wolverton .......... G06F 16/3329 704/9
(Continued)

FOREIGN PATENT DOCUMENTS

DE 102007036425 A1 2/2009
DE 112014006614 T5 1/2017

OTHER PUBLICATIONS

A conversational in-vehicle digital assistant Shih-Chieh Lin (Year: 2018).*
(Continued)

*Primary Examiner* — Anil K Bhargava
(74) *Attorney, Agent, or Firm* — Maginot, Moore & Beck LLP

(57) ABSTRACT

A method for operating a digital assistant of a vehicle includes receiving a command to change an operating mode of the digital assistant from a first mode to a second mode using the digital assistant. The method further includes changing the operating mode in response to the received command, and identifying first, vehicle-specific context information for the second mode. The method also includes providing a message having an operator prompt to a user
(Continued)

depending on the first, vehicle-specific context information identified by the digital assistant, and receiving user input in response to the operator prompt. The method also includes executing an operation corresponding to the user input at least in part using the digital assistant depending on the first, vehicle-specific context information in the second operating mode. A second message is provided to the user depending on the first user input and the first, vehicle-specific context information.

19 Claims, 2 Drawing Sheets

(51) Int. Cl.
*G10L 15/22* (2006.01)
*B60K 35/10* (2024.01)

(52) U.S. Cl.
CPC .. *B60K 2360/148* (2024.01); *G10L 2015/223* (2013.01)

(56) References Cited

U.S. PATENT DOCUMENTS

2017/0010859 A1* 1/2017 Hirai .................... G06F 3/167
2025/0284958 A1* 9/2025 Arar .................... G06N 3/08

OTHER PUBLICATIONS

International Search Report corresponding to International Patent Application No. PCT/EP2022/053269, dated May 2, 2022 (4 pages).

English Translation of Chinese Office Action corresponding to Chinese Patent Application No. 202280009375.7, dated Apr. 28, 2026. (13 pages).

Manuals and guides | vehicle support—experience GM. (Nov. 2020). https://experience.gm.com/ownercenter/content/dam/gmownercenter/gmna/dynamic/manuals/2021/cadillac/ct5/2021-cadillac-ct5-owners-manual.pdf (435 Pages).

* cited by examiner

METHOD FOR OPERATING A DIGITAL ASSISTANT OF A VEHICLE, COMPUTER-READABLE MEDIUM, SYSTEM, AND VEHICLE

The present application is the U.S. national phase of PCT Application PCT/EP2022/053269 filed on Feb. 10, 2022, which claims priority of German patent application No. 10 2021 106 520.8 filed on Mar. 17, 2021, which is incorporated herein by reference in its entirety.

TECHNICAL FIELD

The disclosure relates generally to the field of vehicles, and more specifically, to operating a digital assistant of a vehicle.

BACKGROUND

From the prior art, digital assistants in vehicles are known which can be operated, for example, by means of voice input or gestures. A user of the vehicle can control a function of the digital assistant of the vehicle with a voice command or a gesture, for example, to change a vehicle setting. It is also known that a digital assistant can be used to provide information to a user of the vehicle. When a user makes contact with a vehicle for the first time, the problem can often arise that the user of the vehicle does not know what functions the vehicle has and/or how these functions are operated. Furthermore, the user has no information about how to learn about the functions of the vehicle and/or how to find information about the functions of the vehicle. As a result, the user might use or be able to use only some of the available functions of the vehicle.

An object of the disclosure is therefore to provide methods and apparatus that facilitate operating the digital assistant of a vehicle more efficiently. For example, it is an object to provide vehicle-specific information more efficiently to a user of the vehicle by means of a digital assistant.

SUMMARY

The above stated objects, as well as others, are achieved by the features of the embodiments and developments disclosed herein.

A first aspect is characterized by a method for operating a digital assistant of a vehicle. The method can be a computer-implemented method. The method can be an ECU-implemented method. The digital assistant can be an intelligent personal assistant of the vehicle. The vehicle can be a motor vehicle. The digital assistant can be executed on a head unit and/or on a vehicle infotainment system. The method comprises receiving a command to change an operating mode of the digital assistant from a first digital assistant operating mode to a second digital assistant operating mode by means of the digital assistant. The command can be a voice command, a gesture, and/or a touch command. The method comprises changing the operating mode of the digital assistant from the first operating mode to the second operating mode in response to the received command to change the operating mode of the digital assistant. The digital assistant can carry out the command to change the operating mode and thus change the operating mode of the digital assistant. Changing the operating mode can change the behavior of the digital assistant. Preferably, switching the operating mode can change the interactive behavior of the digital assistant.

The method comprises identifying first, vehicle-specific context information for the second operating mode of the digital assistant. The first vehicle-specific context information can comprise one or more values. For example, the first, vehicle-specific context information may comprise one or more sensor values of one or more sensors of the vehicle, one or more values of a vehicle configuration, one or more values of a user profile of the vehicle and/or one or more values of a driving profile of the vehicle.

The method further comprises providing a first message comprising a first operator prompt to a user depending on the first, vehicle-specific context information provided by the digital assistant. The first operator prompt may be a command prompt for controlling a vehicle function, for example, a climate control function or a driver assistance function, and/or a command prompt for using an input interface of the vehicle. The method further comprises receiving a first user input in response to the first operator prompt by the digital assistant and carrying out an operation corresponding to the first user input by means of the digital assistant depending on the first, vehicle-specific context information in the second operating mode. Furthermore, the method comprises providing a second message to the user depending on the first user input and the first, vehicle-specific context information.

Advantageously, the method can efficiently provide context-sensitive information to a user of the vehicle. The user can more easily learn how to operate the digital assistant and/or to operate a vehicle function using the digital assistant, by the digital assistant providing the user of the vehicle in the second operating mode with a first message before a user input and a second message after carrying out the user input. The digital assistant can assist the vehicle user to interact more efficiently with the vehicle without the user needing to have any prior knowledge about how to interact with the digital assistant. The digital assistant can be operated more efficiently with regard to the provision of information to the user and/or the interaction between the user and the digital assistant of the vehicle.

According to an advantageous embodiment, the command to change the operating mode from the first operating mode of the digital assistant to the second operating mode of the digital assistant is received by the digital assistant from a user of the vehicle, in a sensor- and/or event-controlled manner from a sensor and/or a control unit of the vehicle, or from a mobile terminal connected to the vehicle. This makes it easy to change the operating mode of the digital assistant.

According to a further, advantageous embodiment, the first, vehicle-specific context information for the second operating mode of the digital assistant can differ from a first, vehicle-specific context information of the first operating mode of the digital assistant. This allows an interactive behavior of the digital assistant to be efficiently controlled.

According to a further, advantageous embodiment, the first operator prompt may comprise one or more commands that the digital assistant can carry out, and/or the first user input may include a command of the first operator prompt that can be executed by the digital assistant. This can be used in an efficient way to simplify interaction with the digital assistant.

According to a further, advantageous embodiment, the execution of the operation corresponding to the first user input by the digital assistant depending on the first, vehicle-specific context information in the second operating mode can comprise determining a first output channel depending on the first, vehicle-specific context information, carrying out the operation corresponding to the first user input by means of the digital assistant, and providing first output information to the user of the vehicle via the first output channel depending on the user input while the operation corresponding to the first user input is carried out by the digital assistant. This allows the first output information to be output in a flexible manner. The user can receive the first output information in a precisely controlled manner via the output channel.

According to a further, advantageous embodiment, the execution of the the operation corresponding to first user input by the digital assistant depending on the first, vehicle-specific context information in the second operating mode can comprise determining a second output channel depending on the first, vehicle-specific context information, and providing second output information to the user of the vehicle via the second output channel depending on the user input while the operation corresponding to the first user input is carried out by the digital assistant. This allows the second output information to be output in a flexible manner. The user can receive the output information in a context-sensitive form across multiple output channels.

According to a further, advantageous embodiment, the method can further comprise receiving a command to change the operating mode of the digital assistant from the second digital assistant operating mode to the first digital assistant operating mode by means of the digital assistant, changing the operating mode of the digital assistant from the second operating mode to the first operating mode in response to the received command to change the operating mode of the digital assistant, and identifying first, vehicle-specific context information in the first operating mode, wherein the first, vehicle-specific context information in the first operating mode of the digital assistant is different from the first, vehicle-specific context information of the second operating mode of the digital assistant. The method can further comprise receiving a first user input in the first operating mode from the user by the digital assistant in the first operating mode of the digital assistant, wherein the first user input in the first operating mode corresponds to the first user input in the second operating mode. Furthermore, the method can comprise carrying out the first user input by means of the digital assistant depending on the first, vehicle-specific context information in the first operating mode. This allows user input to be processed efficiently depending on the operating mode of the digital assistant.

According to a further, advantageous embodiment, the execution of the first user input by the digital assistant depending on the first, vehicle-specific context information in the first operating mode can comprise determining a first output channel depending on the first, vehicle-specific context information in the first operating mode of the digital assistant, wherein the first output channel in the first operating mode is preferably different from the first output channel of the digital assistant in the second operating mode of the digital assistant, and wherein the first output channel in the first operating mode is preferably the only output channel of the digital assistant. Further, the method may comprise providing first output information in the first operating mode by the first output channel depending on the user input to the user of the vehicle while the digital assistant carries out the first user input in the first operating mode, wherein the first output information in the first operating mode is preferably different from the first output information in the second operating mode of the digital assistant. This allows the output information to be output in a flexible manner in different operating modes and/or with respect to different context information.

Another aspect is characterized by a computer-readable medium for operating a digital assistant of a vehicle, wherein the computer-readable medium comprises instructions that, when executed on a computer or a control unit of a vehicle, carry out the method described above.

A further aspect is characterized by a system for operating a digital assistant of a vehicle, wherein the system is designed to carry out the method described above.

Yet another aspect is characterized by a vehicle comprising the system described above for operating a digital assistant of a vehicle.

Additional features arise from the claims, the figures and the description of the figures. All the features and feature combinations cited in the description above, and the features and feature combinations cited in the description of the figures below and/or shown in the figures alone are applicable not only in the respective combination indicated, but also in other combinations or else in isolation.

BRIEF DESCRIPTION OF THE DRAWINGS

In the following, an exemplary embodiment is described by reference to the attached drawings. This will reveal further details, embodiments and extensions.

DETAILED DESCRIPTION

Figure 1:
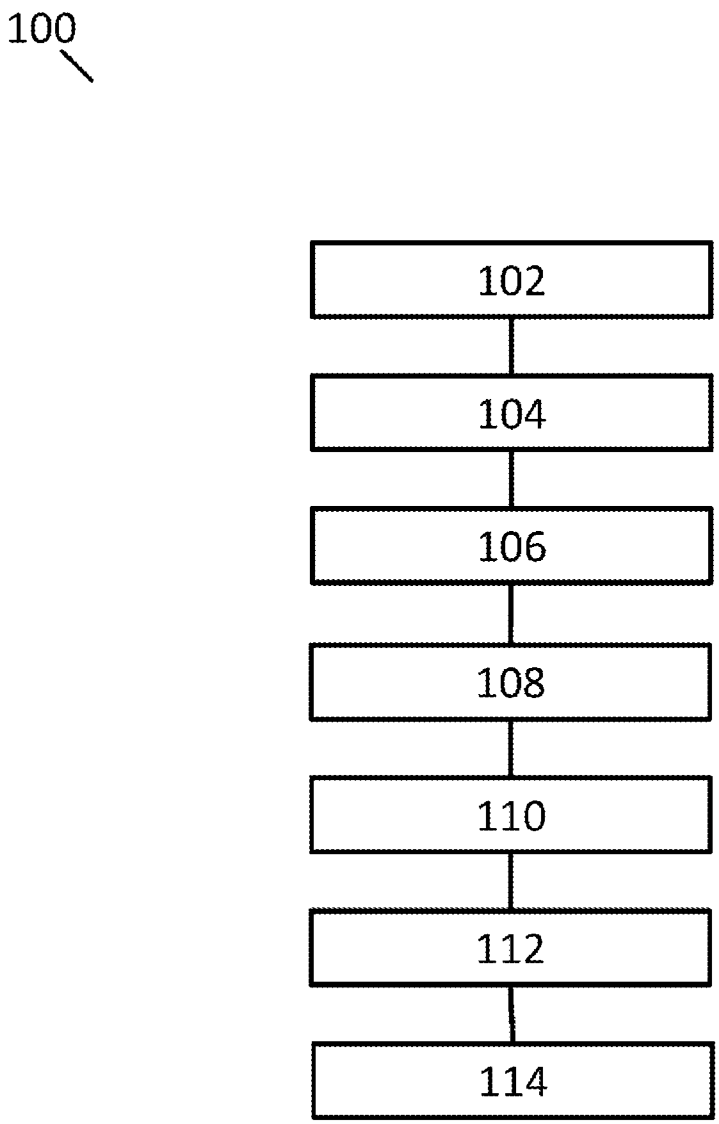
FIG. 1 shows an exemplary method for operating a digital assistant of a vehicle.

In detail, FIG. 1 shows a method 100 for operating a digital assistant of a vehicle. The method 100 can receive 102 a command to change an operating mode of the digital assistant from a first digital assistant operating mode to a second digital assistant operating mode by means of the digital assistant. For example, the 30 command to change the operating mode can be a voice command. For example, the voice command can be received from a user of the vehicle. An example voice command can be: "Hey BMW, show me the functions of the vehicle." or "Hey BMW, show us highlights of the vehicle."

In addition, the method can provide the user of the vehicle with possible functions of the vehicle for selection, from which the user can select a function of the vehicle by means of spoken interaction with the digital assistant. Depending on the selected function, for example, a first, vehicle-specific context of the second operating mode of the digital assistant can be defined. An example of interaction between the digital assistant and the user of the vehicle can be: "The functions of this vehicle are enhanced climate control functions and extensive driver assistance functions. Which function should I explain?". The user of the vehicle may, for example, respond to the message of the digital assistant with "driver assistance" to select the function of the vehicle, the operation of which the user would like to have explained and/or would like to learn in the second operating mode of the digital assistant.

Alternatively, the command to change the operating mode of the digital assistant can be generated under sensor control and received from the digital assistant. For example, the command to change the operating mode may be generated when opening a door of the vehicle and/or occupying a seat, such as a driver's seat or a passenger seat. For example, the command to change the operating mode can be generated proactively and/or depending on a position and received by the digital assistant when a user enters the vehicle.

The second mode of operation of the digital assistant allows the digital assistant of the vehicle to present one or more functions of the vehicle interactively. In addition or alternatively, in the second operating mode the digital assistant of the vehicle may address more senses of the user of the vehicle by using further and/or different output channels of the vehicle compared to the first operating mode of the digital assistant. In addition or alternatively, in the second operating mode of the digital assistant, first, vehicle-specific context information may be used by the digital assistant, which may differ from the first, vehicle-specific context information in the first operating mode of the digital assistant. The first, vehicle-specific context information in the second operating mode may be:

Vehicle stationary
Vehicle moving
Critical/non-critical driving situation
Season,
Temperature,
Location, and/or
Vehicle equipment.

In addition or alternatively, the method 100 can identify user-specific context information. Examples of user-specific context information may include:

previous experience with a function of a vehicle
the number of persons in the vehicle, and/or
features of a driver profile.

Further, the method 100 can change 104 the operating mode of the digital assistant from the first operating mode to the second operating mode in response to the received command to change the operating mode of the digital assistant.

Figure 2:
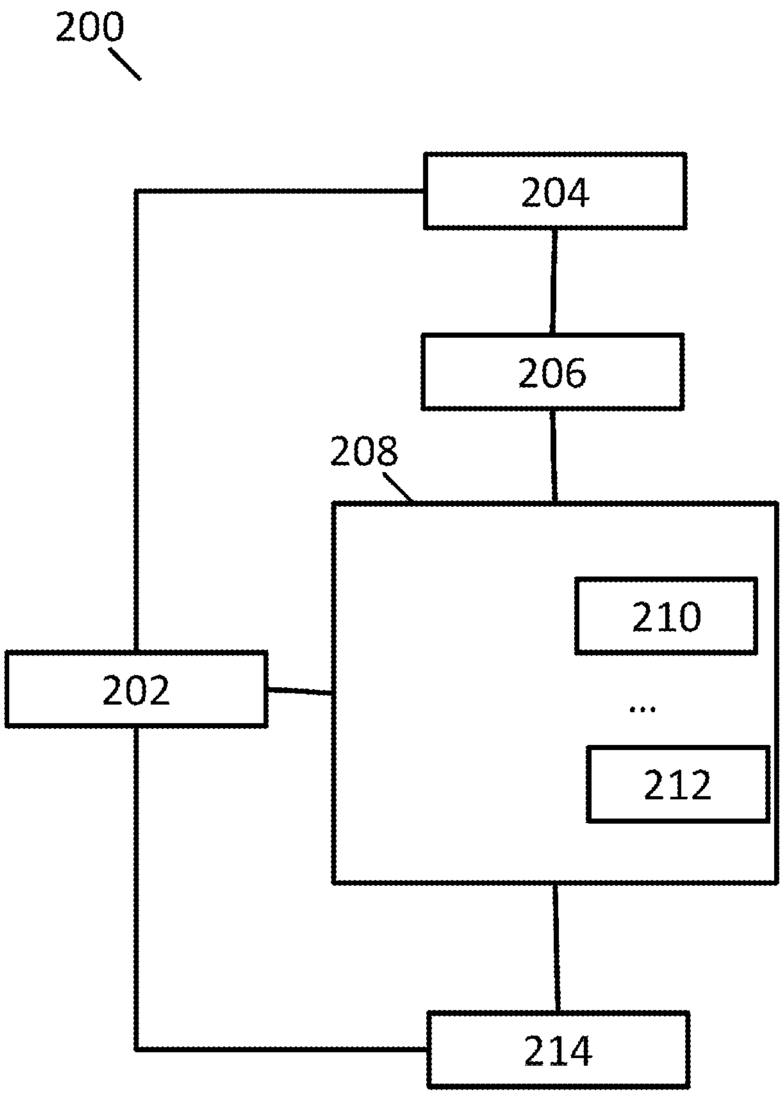
FIG. 2 shows an exemplary second operating mode of a digital assistant.

FIG. 2 shows an exemplary second operating mode 200 of the digital assistant. The method 100 in the second operating mode identifies 106 first, vehicle-specific context information 202. The method 100 can identify first, vehicle-specific context information 202 or a plurality of first, vehicle-specific context information items 202. Table 1 shows an exemplary overview of various first items of vehicle-specific context information 202 for various exemplary functions of the vehicle.

TABLE 1

Overview of first, vehicle-specific context information for functions of the vehicle in the second operating mode of the digital assistant

| Function | first, vehicle-specific context information |
|---|---|
| Climate control | External temperature<br>Internal temperature<br>Status of heat seater<br>Status of presence of passenger |
| Gesture control | Right/left-hand drive vehicle<br>Route guidance currently active: yes/no<br>Has user already performed a gesture before? Yes/no |
| Steering and lane guidance assistant | Vehicle stationary/moving |

The climate control function describes how to use the digital assistant to operate a climate control system of the vehicle. For this function, the method 100 can determine an external temperature, an internal temperature, a status of a seat heater, and/or a status of a presence of a passenger as the first, vehicle-specific context information. The gesture control function describes how to operate the digital assistant using gestures. The gesture control function can use a distinction between right and left-hand drive vehicles, a status of a route guidance system, and/or information on previous use of gesture control as first, vehicle-specific context information 202. The steering and lane-guidance assistant describes how to use the digital assistant to explain the steering and lane guidance assistant of the vehicle. The method 100 can determine a status via a movement state of the vehicle as first, vehicle-specific context information.

The method 100 can provide 108 a first message 204 comprising a first operator prompt to a user of the vehicle depending on the first, vehicle-specific context information or the first, vehicle-specific context information by means of the digital assistant. Table 2 shows examples of first messages for the three functions described above.

TABLE 2

Overview of first messages for functions of the vehicle in the second operating mode of the digital assistant

| Function | first message |
|---|---|
| Climate control | "You can control your climate control system by voice. Just say 'I am cold' " |
| Gesture control | "Also you can set the route guidance to guide you home with a shortcut gesture. Give it a try." [Display an animation of the shortcut] |
| Steering and lane guidance assistant | "I am now going to show you a useful driver assistance function that helps you to steer. Press the button with the XY icon on the steering wheel." |

The method 100 can receive 110 a first user input 206 in response to the first operator prompt by means of the digital assistant. Preferably, the first user input in the second operating mode of the digital assistant is similar to the first user input in the first operating mode of the digital assistant. Table 3 describes an exemplary first user input for the three functions mentioned above.

TABLE 3

Overview of first user inputs for vehicle functions

| Function | first user input |
|---|---|
| Climate control | "I am cold" |
| Gesture control | [User performs the shortcut gesture] |
| Steering and lane guidance assistant | [User presses the button for the steering and lane guidance assistant.] |

The method 100 can carry out 112 an operation corresponding to the first user input depending on the first vehicle-specific context information in the second operating mode of the digital assistant. Carrying out the operation corresponding to the first user input may result in a system response 108 in the second operating mode of the digital assistant, which differs from a system response in the first operating mode of the digital assistant. In addition or alternatively, when carrying out the first user input in the second operating mode of the digital assistant, different output channels 210, 212 of the vehicle compared to the first operating mode and/or the same output channels 210, 212 as in the first operating mode, but with different output information, can be used to communicate output information to the user of the vehicle. Preferably, when carrying out the operation corresponding to the first user input in the second operating mode, an additional output channel or a plurality of additional output channels of the vehicle are used to address other senses of the user of the vehicle and/or to provide additional output information to the user. Additional output channels may be, for example, an audio output channel of the vehicle. In the second operating mode, the audio output channel can provide output information to the user of the vehicle with a higher volume and/or a different listening zone configuration compared to the first operating mode. Furthermore, a fragrance dispenser of the vehicle can be used as an additional output channel to stimulate other senses of the user of the vehicle. Furthermore, as an additional output channel in the second operating mode, further display devices of the vehicle can be used to provide an explanation of a function of the vehicle by means of a visual animation of the digital assistant. Table 4 provides an overview of example system responses and example output information via output channels in the second operating mode of the digital assistant.

TABLE 4

Overview of system responses, output information, and output channels when carrying out the operation corresponding to a first user input in the second operating mode.

| Function | System response | Output information and output channels |
| --- | --- | --- |
| Climate control | Increases the internal temperature for the driver | Voice output: "I am increasing the temperature by 2 degrees". Display: Displays the temperature increase Visualization Voice assistant: Animation Internal lighting: change the light color to red |
| Gesture control | System recognizes gesture, but does not start the route guidance | Voice output: "Very good, that worked really well." Visualization Voice assistant: Animation Audio output: outputs a tone for operator feedback Display: displays the sat-nav map with example route guidance animation |
| Steering and lane guidance assistant | Input is recognized, but SLA is not activated because vehicle is stationary | Voice output: "Very good, that's exactly how you activate the function. I recommend you activate the function in the following situations . . . " Audio output: tone for activation is output Combi-Display: Animation to explain the function Head-Up Display: Animation to explain the function |

The method 100 can provide 114 a second message 214 to the user of the vehicle depending on the first user input and on the first, vehicle-specific context information. The second message 214 may comprise further explanations for the respective function of the vehicle, which the digital assistant provides to the user of the vehicle. For example, if the first vehicle-specific context information indicates that a passenger is sitting in the vehicle, the digital assistant for the climate control function can provide an explanation or an instruction as the second message, which explains how the passenger operates the climate control function or indicates a means for the passenger to operate the climate control function. Table 5 provides an overview of example second messages for the respective function of the vehicle in the second operating mode of the digital assistant.

TABLE 5

Overview of example second messages in the second operating mode for the example functions of the vehicle

| Function | second message |
| --- | --- |
| Climate control | Voice Assistant: "By the way, the passenger can also adjust their temperature by voice." |
| Gesture control | Voice Assistant: "You can also control other functions using gestures. Would you like to hear more?" |
| Steering and lane guidance assistant | "I am now going to show you how you can adjust your speed and distance from the following vehicle." |

Advantageously, the second operating mode of the digital assistant can provide information for operating functions of the vehicle to a user of the vehicle more efficiently. The user of the vehicle can easily obtain explanations of the functions of the vehicle without knowledge of the functions of the vehicle. The system response and the choice of output channels and the output information allow the user to quickly learn about the functions of the vehicle. Depending on the first, context information, the user is dynamically guided through the functions of the vehicle and can experience them interactively, whether the vehicle is in driving mode or stationary. The operation of the vehicle functions can be efficiently learned by the user of the vehicle. This can efficiently reduce and/or avoid distraction of the user while driving.

LIST OF REFERENCE SIGNS

100 method
102 receiving a command
104 changing the operating mode
106 identifying first vehicle-specific context information
108 providing a first message
110 receiving a first user input
112 carrying out the first user input
114 providing a second message
200 second operating mode
202 first, vehicle-specific context information item or first, vehicle-specific context information items
204 first message
206 first user input
208 system response
210 first output channel
212 second output channel
214 second message

The invention claimed is:

1. A method for operating a digital assistant of a vehicle, the method comprising:

receiving a command to change an operating mode of the digital assistant from a first digital assistant operating mode to a second digital assistant operating mode by means of the digital assistant;

changing the operating mode of the digital assistant from the first operating mode to the second operating mode in response to the received command to change the operating mode of the digital assistant;

identifying first, vehicle-specific context information for the second operating mode of the digital assistant, wherein the first, vehicle-specific context information comprises user-specific context information indicating that the user has not previously used a function of the vehicle;

providing a first message comprising a first operator prompt to a user depending on the first, vehicle-specific context information identified by the digital assistant;

receiving a first user input in response to the first operator prompt by means of the digital assistant;

executing an operation corresponding to the first user input at least in part using the digital assistant depending on the first, vehicle-specific context information in the second operating mode; and providing a second message to the user depending on the first user input and the first, vehicle-specific context information.

2. The method of claim 1, wherein the digital assistant is configured to cause a physical system response responsive to a user input.

3. The method as claimed in claim 1, wherein the command to change the operating mode from the first operating mode of the digital assistant to the second operating mode of the digital assistant is received by the digital assistant without user input from a control unit based on a sensor of the vehicle sensing a condition of the vehicle.

4. The method as claimed in claim 1, wherein the first, vehicle-specific context information for the second operating mode of the digital assistant differs from a first, vehicle-specific context information of the first operating mode of the digital assistant.

5. The method as claimed in claim 1, wherein the first operator prompt includes one or more commands that the digital assistant can execute; or wherein the first user input includes a command of the first operator prompt, which corresponds to an operation that can be executed by the digital assistant.

6. The method of claim 5, wherein the digital assistant is configured to cause a physical system response responsive to a user input.

7. The method as claimed in claim 1, wherein the execution of the operation corresponding to the first user input by the digital assistant depending on the first, vehicle-specific context information in the second operating mode comprises:

determining a first output channel depending on the first, vehicle-specific context information;

executing the operation corresponding to the first user input by means of the digital assistant; and providing first output information to the user of the vehicle via the first output channel depending on the first user input while the operation corresponding to the first user input is carried out by the digital assistant.

8. The method as claimed in claim 7, wherein the execution of the operation corresponding to the first user input by the digital assistant depending on the first, vehicle-specific context information in the second operating mode also comprises:

determining a second output channel based on the first, vehicle-specific context information; and providing second output information to the user of the vehicle via the first output channel depending on the first user input while the operation corresponding to the first user input is carried out by the digital assistant.

9. The method as claimed in claim 7, further comprising:

receiving a further command to change the operating mode of the digital assistant from the second digital assistant operating mode to the first digital assistant operating mode by means of the digital assistant;

changing the operating mode of the digital assistant from the second operating mode to the first operating mode in response to the received further command;

identifying first, vehicle-specific context information in the first operating mode, wherein the first, vehicle-specific context information in the first operating mode of the digital assistant is different from the first, vehicle-specific context information of the second operating mode of the digital assistant;

receiving a further user input in the first operating mode from the user by the digital assistant in the first operating mode of the digital assistant, wherein the further user input in the first operating mode corresponds to the first user input in the second operating mode; and executing an operation corresponding to the further user input by means of the digital assistant depending on the first, vehicle-specific context information in the first operating mode.

10. The method as claimed in claim 9, wherein the execution of the operation corresponding to the further user input by the digital assistant depending on the first, vehicle-specific context information in the first operating mode comprises:

determining a further first output channel depending on the first, vehicle-specific context information in the first operating mode of the digital assistant, wherein the further first output channel in the first operating mode is different from the first output channel of the digital assistant in the second operating mode of the digital assistant, and wherein the further first output channel in the first operating mode is an only output channel of the digital assistant in the first operating mode; and providing further output information via the further first output channel.

11. The method of claim 10, wherein the digital assistant is configured to cause a physical system response responsive to a user input.

12. The method as claimed in claim 10, wherein the execution of the operation corresponding to the further user input by the digital assistant depending on the first, vehicle-specific context information in the first operating mode comprises:

providing the further output information in the first operating mode to the user of the vehicle via the first output channel depending on the first user input while the operation corresponding to the further user input is carried out by the digital assistant in the first operating mode, wherein the further output information in the first operating mode is different from the first output information in the second operating mode of the digital assistant.

13. The method as claimed in claim 9, wherein the execution of the operation corresponding to the further user input by the digital assistant depending on the first, vehicle-specific context information in the first operating mode comprises:

providing further first output information in the first operating mode to the user of the vehicle via a further first output channel depending on the first user input while the operation corresponding to the further user input is carried out by the digital assistant in the first operating mode, wherein the further first output information in the first operating mode is different from the first output information in the second operating mode of the digital assistant.

14. The method as claimed in claim 1, further comprising:

receiving a further command to change the operating mode of the digital assistant from the second digital assistant operating mode to the first digital assistant operating mode by means of the digital assistant;

changing the operating mode of the digital assistant from the second operating mode to the first operating mode in response to the received further command;

identifying first, vehicle-specific context information in the first operating mode, wherein the first, vehicle-specific context information in the first operating mode of the digital assistant is different from the first, vehicle-specific context information of the second operating mode of the digital assistant;

receiving a further user input in the first operating mode from the user by the digital assistant in the first operating mode of the digital assistant, wherein the further user input in the first operating mode corresponds to the first user input in the second operating mode; and executing an operation corresponding to the further user input by means of the digital assistant depending on the first, vehicle-specific context information in the first operating mode.

15. The method as claimed in claim 1, wherein the first operator prompt presents a function of the vehicle for the user to try depending on whether the user has previously used the function of the vehicle.

16. The method as claimed in claim 1, wherein the first operator prompt presents a gesture to try.

17. A non-transitory computer-readable medium for operating a digital assistant of a vehicle, wherein the computer-readable medium comprises instructions that, when executed on a computer or a control unit of a vehicle, carry out the method as claimed in claim 1.

18. A system for providing a digital assistant of a vehicle, wherein the system includes a processing device that executes instructions to carry out the method as claimed in claim 1.

19. A vehicle comprising the system for operating a digital assistant of a vehicle as claimed in claim 18.

* * * * *